UNITED STATES PATENT OFFICE.

CHRISTIAN RUDOLPH, OF HÖCHST-ON-THE-MAIN, GERMANY, ASSIGNOR TO FARBWERKE, VORMALS MEISTER, LUCIUS & BRÜNING, OF SAME PLACE.

MANUFACTURE OF ARTIFICIAL INDIGO.

SPECIFICATION forming part of Letters Patent No. 262,695, dated August 15, 1882.

Application filed April 18, 1882. (Specimens.)

*To all whom it may concern:*

Be it known that I, CHRISTIAN RUDOLPH, a citizen of Germany, residing at Höchst-on-the-Main, Germany, have invented certain new and useful Improvements in the Production of Artificial Indigo; and I do hereby declare that the following is a full, clear, and exact description of the invention, which will enable others skilled in the art to which it appertains to make and use the same.

My invention relates to an improvement in the production of artificial indigo.

It consists in producing artificial indigo from benzaldehyde in the manner hereinafter to be described.

In producing monobenzylidenacetone I use the simplest known method, which is that described by Schmidt Claisen in "Berichte der Deutschen Chemischen Gesellschaft,"(1881, pp. 2,472,)—viz., from benzaldehyde and acetone in a weak solution of caustic soda. The next step is the conversion of the monobenzylidenacetone into its orthonitromono substitution product, which is done as follows: one part monobenzylidenacetone is mixed with the quintuple quantity of sulphuric acid. Into this mixture I pour slowly the calculated quantity of nitric acid at a temperature of 32.59° Fahrenheit, (0.15° centigrade,) and having a specific gravity of 1.46, dissolved in the double quantity of sulphuric acid. After this operation is completed the nitro compounds which remain in solution in the sulphuric acid are separated by pouring this solution into a large quantity of water. Said nitro compounds are afterward collected on a filter, and after being carefully washed in water they are dissolved in one and a half time the quantity of alcohol. After this solution has been standing for several hours the paranitromonobenzylidenacetone will have separated almost completely. The residual liquor or filtrate contains the orthonitrobenzylidenacetone, which can be obtained by distilling off the alcohol or by adding to the residual liquor the triple to quadruple quantity of water. If, now, the orthonitrobenzylidenacetone be digested for some time in an alcoholic soda-lye, (one part of the nitrate, five parts alcohol, and three parts of soda-lye of ten per cent.,) it becomes converted into a new substance, which, after the acidulation of the solution, can be separated by washing it out with ether.

From this substance I obtain, by heating its aqueous solution, or, better still, by adding alkalies—such as soda or caustic soda—to the solution, a considerable quantity of artificial indigo, which may be obtained in a pure state by further washing the same with water and alcohol.

Having thus described my invention, what I claim as new, and desire to secure by Letters Patent, is—

1. The process of manufacturing an artificial indigo from benzaldehyde, which consists in first converting the same into monobenzylidenacetone by the ordinary well-known method, then converting said monobenzylidenacetone into its orthonitro substitution derivative, separating this orthonitro product from isomers by crystallization, filtration, and distillation, and finally converting it into the indigo-blue coloring-matter by digestion in a weak alkaline lye.

2. A blue coloring-matter or dye-stuff (an artificial indigo) prepared by the process herein set forth.

In testimony that I claim the foregoing as my own I affix my signature in presence of two witnesses.

CHRISTIAN RUDOLPH.

Witnesses:
JOSEPH EUGEN REVERDY,
ALBERT FRÖSCHMANN.